Sept. 1, 1953 — E. RUSSELL — 2,650,536
SPAGHETTI COOKING APPARATUS
Filed Aug. 23, 1950

INVENTOR.
Emil Russell
BY Lynn Latta
Attorney.

Patented Sept. 1, 1953

2,650,536

UNITED STATES PATENT OFFICE 2,650,536

SPAGHETTI COOKING APPARATUS

Emil Russell, Culver City, Calif.

Application August 23, 1950, Serial No. 180,960

1 Claim. (Cl. 99—416)

This invention relates to the cooking of spaghetti, macaroni and other food materials of this class. Its general object is to provide an improved apparatus whereby the material may be precooked in individual servings, drained immediately after cooking so as to preserve to the fullest extent the quality of the material, then placed in a refrigerator and preserved for serving when needed. The invention is particularly useful in restaurants and other eating places where spaghetti and the like are served, and where it may be necessary to precook the material considerably in advance of the actual serving thereof. The necessity for this creates quite a problem. Where such food is cooked in a large body and allowed to cool before serving, there is involved, upon a call for an individual serving, the problem of either reheating the entire body of national or subtracting from the body an individual serving and reheating that individual serving. Where the entire body of material is reheated a number of times, the quality of the food is gradually deteriorated. Where an individual quantity is taken from the body of cooked material, there is considerable trouble involved in placing it in a small heating receptacle and reheating it individually.

With the foregoing in mind, the invention has as its general object to provide an improved method of preparing spaghetti and the like for serving, in which the food is first cooked in individual cooking containers, is then drained, is then transferred to a refrigerator to preserve it with its full flavor and quality, for future use, is then reheated, when ready for use, in the original individual containers, and is finally removed from the individual containers to the dish upon which it is served to a customer.

A primary object of the invention is to provide a method and apparatus whereby spaghetti may be prepared in advance and served in individual servings with the quality and flavor preserved to a maximum degree. A further object is to provide such a method and apparatus which will accurately measure the individual servings so as to give uniformity therein. A further object is to provide such a method and apparatus that will greatly reduce the amount of work involved in the preparation and serving of spaghetti and the like.

Other objects will become apparent in the ensuing specifications and appended drawings in which.

Figure 1:
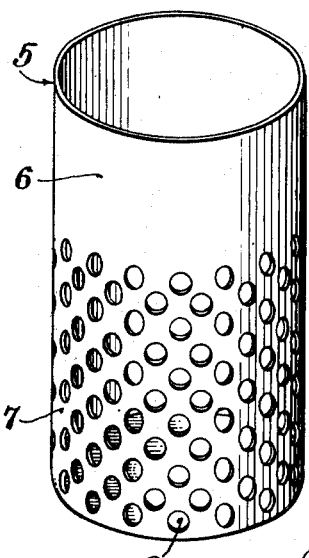
Fig. 1 is a perspective view of one of the individual cooking and reheating containers.

Referring now to the drawings in detail, the invention provides a set of apparatus including a series of individual cooking receptacles one of which is shown at 5 in Fig. 1. The receptacle 5 may be of any suitable material that will withstand the action of boiling water, for example, stainless steel or any other suitable corrosion resistant sheet metal. It includes a cylindrical wall having an imperforate upper portion 6 and a perforated lower portion 7.

It also includes a bottom 8 which may or may not be perforated, although preferably it is perforated.

Figure 3:
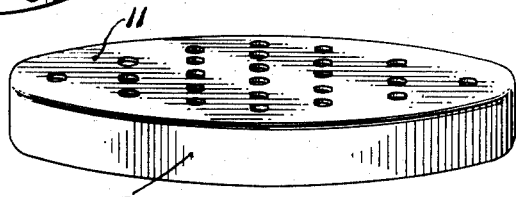
Fig. 3 is a perspective view of the supporting stand on which the individual containers are supported while cooking the spaghetti in a cooking receptacle.
Figure 4:
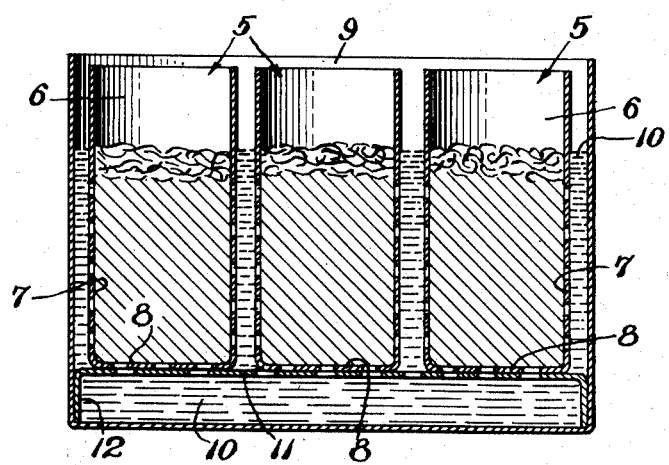
Fig. 4 is a sectional view through the cooking receptacle and a series of individual cooking containers therein, in the cooking or reheating process.

The spaghetti, macaroni, noodles or the like which are to be cooked, are placed in measured quantities in the individual containers 5 and these containers are inserted into a cooking kettle 9 which is shown in Fig. 4. The kettle 9 is partially filled with water, indicated at 10, and the individual cooking containers 5 are supported upon a perforated false bottom 11 which has a rim 12 to rest against the bottom of receptacle 9 and support the same spaced above the bottom of receptacle 9. The false bottom 11 is shown in perspective in Fig. 3.

After the spaghetti or the like has been adequately cooked, the receptacles 5 are removed from the cooking kettle 9 and are placed in a drain tank 13 to drain excess water therefrom. This is done immediately after removing the containers 5 from the kettle 9, in order that the quality of the spaghetti may be preserved to a maximum degree. The drain tank 13, which may be of any selected shape, is in the form of an open tray having a bottom 14 and marginal walls 15. Within the drain tank 13 is a perforated false bottom 16 on which the containers 5 are supported in positions elevated above the bottom 14 so that the excess moisture may drain into the tank below the bottoms of containers 5.

After the moisture has sufficiently drained from the containers 5, the containers with the cooked food therein, are placed in a refrigerator to keep for future serving. As servings are called for, the containers are removed from the refrigerator, one by one, placed back in the receptacle 9 and subjected to the action of hot water therein, for reheating the food, and after being sufficiently reheated, each receptacle 5 is removed and its contents discharged upon a serving plate. Thus each individual serving is of uniform quality and quantity, provided of course that the food has been accurately measured into the receptacle 5 prior to cooking.

Figure 2:
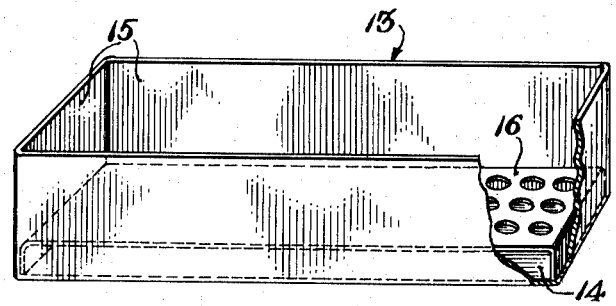
Fig. 2 is a perspective view partially broken away, of a drain receptacle.

The invention eliminates deterioration arising from maintaining a body of spaghetti heated for an extended period of time awaiting a call for a serving. Improved flavor and retention of the better elements of the food are obtained by reason of the fact that the food, contained in the individual serving receptacles, is cooked with maximum swiftness when immersed in boiling water, and, upon being removed from the water, may be immediately drained by using the drain receptacle of Fig. 2, and, as soon as the excess moisture is removed, may be immediately placed in a refrigerator to cool the food down to a preservative temperature. Thus the food is exposed for a minimum length of time to the deteriorating effect of heat.

Being tall and relatively narrow, the receptacles 5 are easily handled in being placed into and removed from the kettle 9.

I claim:

Apparatus for cooking spaghetti, macaroni and the like, and preparing it for serving, comprising a plurality of receptacles each of a size to hold a measured individual serving portion, each receptacle being of greater height than diameter, having a cylindrical lateral wall including an imperforate upper portion and a perforate lower portion the axial dimensions of which are, respectively, roughly one third and two thirds of the total height of the receptacle; a cooking kettle of generally cylindrical shape, the diameter of which is related to the diameter of said receptacle so that a predetermined number of the receptacles can be arranged within the kettle without wastage of the available space therein; and a false bottom member including a flat perforate web functioning as a supporting platform and peripheral supporting means projecting downwardly from said web for resting upon the bottom of the kettle and supporting the web in an elevated position above the bottom; said perforated lower portions of the receptacles functioning as measures for indicating the proper amount of uncooked food to be placed in the receptacles and also functioning to admit steam and boiling water from a body of water within the kettle, for passage into the individual receptacles and upwardly through the food and into said imperforate upper receptacle portions; said imperforate upper receptacle portions functioning to confine the food against escape from the receptacles under the action of water boiling upwardly within said receptacles.

EMIL RUSSELL.

References Cited in the file of this patent

UNITED STATES PATENTS

| Number | Name | Date |
|---|---|---|
| 814,714 | Longhenry | Mar. 13, 1906 |
| 975,843 | Duffy | Nov. 15, 1910 |
| 1,265,611 | Clarke | May 7, 1918 |
| 1,272,222 | Clayton | July 9, 1918 |
| 1,445,457 | Simon | Feb. 13, 1923 |

FOREIGN PATENTS

| Number | Country | Date |
|---|---|---|
| 12,915 | France | Sept. 27, 1910 |
| 416,576 | France | May 31, 1910 |
| 426,766 | France | July 18, 1911 |